US011366309B2

(12) United States Patent
McNally et al.

(10) Patent No.: US 11,366,309 B2
(45) Date of Patent: Jun. 21, 2022

(54) SCANNING PROJECTOR DISPLAY WITH MULTIPLE LIGHT ENGINES

(71) Applicant: Facebook Technologies, LLC, Menlo Park, CA (US)

(72) Inventors: Stephen James McNally, Sammamish, WA (US); Chadwick Brian Martin, Kirkland, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 488 days.

(21) Appl. No.: 16/443,644

(22) Filed: Jun. 17, 2019

(65) Prior Publication Data
US 2020/0310111 A1    Oct. 1, 2020

Related U.S. Application Data

(60) Provisional application No. 62/829,176, filed on Apr. 4, 2019, provisional application No. 62/826,678, filed on Mar. 29, 2019.

(51) Int. Cl.
*G02B 26/08* (2006.01)
*G02B 26/10* (2006.01)
(Continued)

(52) U.S. Cl.
CPC ....... *G02B 26/101* (2013.01); *G02B 26/0833* (2013.01); *G02B 27/0172* (2013.01);
(Continued)

(58) Field of Classification Search
CPC .............. G02B 26/101; G02B 26/0833; G02B 27/0172; G02B 27/283; G02B 2027/0112;
(Continued)

(56) References Cited

U.S. PATENT DOCUMENTS 8,593,701 B2 * 11/2013 Soeda .................... G02B 27/42
359/204.3
2009/0040477 A1 * 2/2009 Matsumoto ........... H01S 5/4025
353/94
(Continued)

FOREIGN PATENT DOCUMENTS

DE    102013224420 A1    11/2014
EP      2023452 A2     2/2009
(Continued)

OTHER PUBLICATIONS

Non-Final Office Action dated Aug. 19, 2021 for U.S. Appl. No. 16/506,899, filed Jul. 9, 2019, 20 Pages.
(Continued)

*Primary Examiner* — Euncha P Cherry
(74) *Attorney, Agent, or Firm* — Pequignot + Myers; Matthew A. Pequignot

(57) ABSTRACT

A scanning projector display includes a plurality of light engines coupled to a MEMS scanner. Each light engine includes a light source subassembly for providing a diverging light beam optically coupled to a collimator for collimating the diverging light beam. In operation, the collimated light beams of the plurality of light engines impinge onto the tiltable reflector at different angles of incidence. A controller may be operably coupled to the light source subassembly of each light engine of the plurality of light engines and the MEMS scanner for tilting the tiltable reflector of the MEMS scanner. The controller is configured to energize the light source of each light engine in coordination with tilting the tiltable reflector for displaying the image.

19 Claims, 17 Drawing Sheets

(51) Int. Cl.
  *G02B 27/28* (2006.01)
  *G02B 27/01* (2006.01)
  *H04N 9/31* (2006.01)

(52) U.S. Cl.
  CPC .... *G02B 27/283* (2013.01); *G02B 2027/0112* (2013.01); *G02B 2027/0123* (2013.01); *G02B 2027/0178* (2013.01); *H04N 9/3129* (2013.01); *H04N 9/3164* (2013.01)

(58) Field of Classification Search
  CPC .... G02B 2027/0123; G02B 2027/0178; G02B 27/0093; G02B 27/18; H04N 9/3129; H04N 9/3164; H04N 9/3152; G03B 21/008; G03B 21/10
  USPC ...................................... 359/204.4
  See application file for complete search history.

(56) References Cited

U.S. PATENT DOCUMENTS

| | | | |
|---|---|---|---|
| 2009/0128717 A1* | 5/2009 | Nagashima | H04N 9/3155 348/756 |
| 2010/0315605 A1* | 12/2010 | Arita | G02B 26/0816 353/98 |
| 2010/0321781 A1 | 12/2010 | Levola et al. | |
| 2011/0280267 A1 | 11/2011 | Yoshikawa et al. | |
| 2012/0275134 A1 | 11/2012 | Takahashi et al. | |
| 2016/0330418 A1 | 11/2016 | Nakai et al. | |
| 2020/0166754 A1 | 5/2020 | Leister et al. | |
| 2020/0209625 A1 | 7/2020 | Takeda et al. | |

FOREIGN PATENT DOCUMENTS

| | | |
|---|---|---|
| EP | 2518560 A1 | 10/2012 |
| JP | 2007201285 A | 8/2007 |
| WO | 2019003546 A1 | 1/2019 |

OTHER PUBLICATIONS

Mike Cooke "Osram Opto achieves cyannitride semiconductor superluminescent LED—InGaN device outputs more than 4mW of 500nm-wavelength light, promising application to projectors" semiconductorTODAY Compounds & Advanced Silicon • vol. 7 • Issue 8 • Oct. 2012.
International Search Report and Written Opinion for International Application No. PCT/US2020/021442, dated Jul. 31, 2020, 14 Pages.
International Search Report and Written Opinion for International Application No. PCT/US2020/024157, dated Jul. 3, 2020, 11 Pages.
PCT/US2020/021442 Partial Search Report dated Jun. 8, 2020.
Final Office Action dated Mar. 29, 2022 for U.S. Appl. No. 16/506,899, filed Jul. 9, 2019, 20 pages.

* cited by examiner

View B-B

SCANNING PROJECTOR DISPLAY WITH MULTIPLE LIGHT ENGINES

REFERENCE TO RELATED APPLICATION

The present application claims priority from U.S. Provisional Patent Application No. 62/826,678 entitled "FOLDED OPTICAL CONFIGURATION FOR A SCANNING PROJECTOR DISPLAY" filed on Mar. 29, 2019, and from U.S. Provisional Patent Application No. 62/829,176 entitled "SCANNING PROJECTOR DISPLAY WITH MULTIPLE LIGHT ENGINES" filed on Apr. 4, 2019, both incorporated herein by reference in their entireties.

TECHNICAL FIELD

The present disclosure relates to virtual/augmented/mixed reality displays and headsets, and in particular to optical components and modules for near-eye displays, head-mounted displays, etc.

BACKGROUND

Head-mounted displays (HMDs) and other wearable and/or near-eye display (NED) systems can be used to present virtual scenery to a user, or to augment real scenery with dynamic information, data, or virtual objects. The virtual reality (VR), augmented reality (AR), and/or mixed reality (MR) visual information can be three-dimensional (3D) to enhance the experience and to match virtual objects to real objects observed by the user. Eye position and gaze direction, and/or orientation of the user may be tracked in real time, and the displayed scenery may be dynamically adjusted depending on the user's head orientation and gaze direction, to provide a better experience of immersion into a simulated or augmented environment.

Compact displays are desired in wearable display devices. Because a display unit of a head-mounted display device is usually worn on the head of a user, a large, bulky, unbalanced, and/or heavy head-mounted display device would be cumbersome and may be uncomfortable for the user to wear. Because of this, it is highly desirable to reduce size and weight of a head-mounted display.

Scanning projector displays provide an image in angular domain, which can be observed by a user directly, without an intermediate screen or a display panel. The lack of a screen or a display panel in a scanning projector display enables size and weight reduction of the display. It is desirable to further miniaturize a scanning projector display, while increasing the image quality, field of view, and resolution of the observed image.

SUMMARY

In accordance with the present disclosure, there is provided a scanning projector display comprising a plurality of light engines, each light engine comprising a light source subassembly for providing a diverging light beam optically coupled to a collimator for collimating the diverging light beam to provide a collimated light beam. The scanning projector display further includes a MEMS scanner comprising a tiltable reflector configured to receive and scan the collimated light beam from each light engine of the plurality of light engines to form an image in angular domain. In operation, the collimated light beams provided by the plurality of light engines impinge onto the tiltable reflector at different angles of incidence.

The collimator may include a folded-beam optical element comprising at least one reflective surface having optical power. The light source subassembly may include a solid-state light source including e.g. a plurality of light-emitting semiconductor chips supported by a substrate. The collimator may be supported by the substrate of the corresponding solid-state light source. At least one of the plurality of light-emitting semiconductor chips may include a plurality of emitters. The plurality of light-emitting semiconductor chips may include a plurality of superluminescent light-emitting diodes (SLEDs). In some embodiments, the plurality of light-emitting semiconductor chips includes red, green, and blue color channel light-emitting semiconductor chips for emitting light beams of red, green, and blue color channels, respectively, of the image to be displayed. The red, green, and blue color channel light-emitting semiconductor chips may be side-emitting chips for emitting the light beams at respective end facets of the red, green, and blue color channel light-emitting semiconductor chips. The end facets of the red, green, and blue color channel light-emitting semiconductor chips may be disposed at different distances from the corresponding collimator to offset chromatic aberration of the collimator. The red, green, and blue color channel light-emitting semiconductor chips may also be oriented at different angles w.r.t the corresponding collimator to direct their light beams to a clear aperture of the collimator.

In some embodiments, the tiltable reflector has a range of tilt angles, and in operation, a difference between angles of incidence of the collimated light beams provided by two of the plurality of light engines at the tiltable reflector is no greater than the range of tilt angles of the tiltable reflector, such that an overlap exists between fields of view provided by each one of the two of the plurality of light engines. The overlap may be e.g. at least 10% of the field of view provided by each one of the two of the plurality of light engines. In some embodiments, a controller is operably coupled to the light source subassembly of each light engine of the plurality of light engines and the MEMS scanner, for tilting the tiltable reflector of the MEMS scanner. The controller may be configured to energize the light source of each light engine in coordination with tilting the tiltable reflector for displaying the image. The controller may be further configured to energize the light source of each light engine with a delay corresponding to a difference of the angles of incidence of the corresponding collimated light beams onto the tiltable reflector. The tiltable reflector may include a 2D tiltable reflector, for example.

In accordance with the present disclosure, there is further provided a method for displaying an image. The method includes energizing a plurality of light engines for providing a plurality of collimated light beams, directing the plurality of collimated light beams onto a tiltable reflector of a MEMS scanner at different angles of incidence, and tilting the tiltable reflector of the MEMS scanner in coordination with the energizing the plurality of light engines to display the image. The light engines may be energized with a delay corresponding to a difference of the angles of incidence of the corresponding collimated light beams onto the tiltable reflector.

In accordance with the present disclosure, there is further provided a scanning projector display including a first light engine comprising a first light source subassembly for providing a first diverging light beam optically coupled to a first collimator for collimating the first diverging light beam to provide a first collimated light beam having a first polarization. A second light engine comprises a second light source subassembly for providing a second diverging light beam optically coupled to a second collimator for collimating the second diverging light beam to provide a second collimated light beam having a second polarization orthogonal to the first polarization. A polarization beam combiner is configured for receiving the first and second collimated light beams and combining the first and second collimated light beams into an output beam. A MEMS scanner comprises a tiltable reflector configured to receive and scan the output beam to form an image in angular domain. In some embodiments, the scanning projector display further includes a controller operably coupled to the first and second light source subassemblies and the MEMS scanner for tilting the tiltable reflector of the MEMS scanner and configured to energize the first and second light source subassemblies in coordination with tilting the tiltable reflector for displaying the image.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

A projector display may use a MEMS scanner to scan an image-forming optical beam across the display's field of view (FOV). A tradeoff exists between the scanning range and size/stiffness/optical quality of a tiltable MEMS mirror used to scan the optical beam. The MEMS mirror needs to be comparatively large, flat, and stiff to provide a good optical quality of the scanned beam and, consequently, a good quality of the displayed image. On the other hand, this makes the mirror heavier. Heavier mirrors require stiffer hinges, which limit the scanning range.

In accordance with the present disclosure, the field of view (FOV) of a scanning projector display may be broken into two or more sections, and a separate light engine may be used for each section. Light from multiple light engines may be directed to a same tiltable reflector, e.g. a 2D-scanned MEMS mirror. This enables one to increase the overall FOV without sacrificing the optical quality of the displayed image. One may also increase the overall resolution of the display, either locally or across a portion of the field of view where the two or more projected fields of view overlap.

Figure 1A:
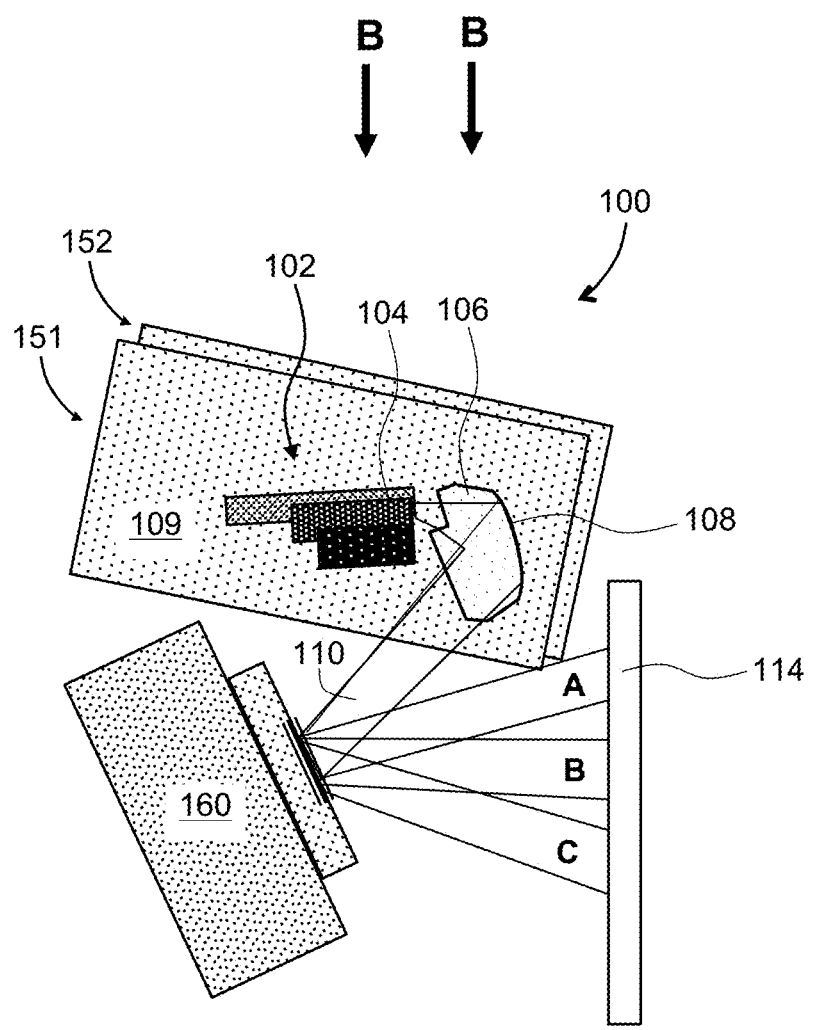
FIG. 1A is a schematic view of a scanning projector display of the present disclosure.
Figure 1B:
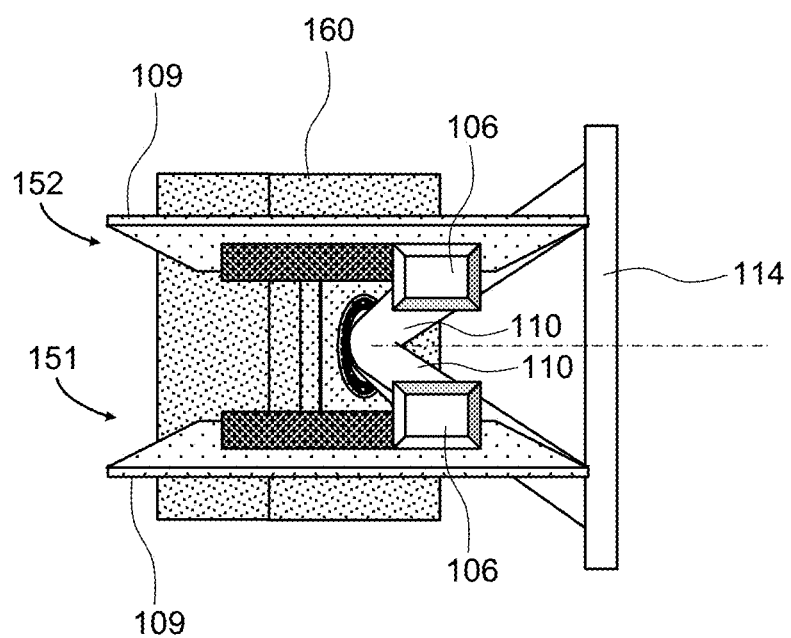
FIG. 1B is a top view of the scanning projector display when viewed in the direction B-B shown in FIG. 1A.

Referring to FIGS. 1A and 1B, a scanning projector display 100 includes a pair of light engines 151, 152 disposed side-by-side as shown. Each light engine 151, 152 includes a solid-state light source subassembly 102, which may include a stack of semiconductor chips 104 for providing red (R), green (G), and blue (B) color channel light of an image to be displayed, e.g. laser diodes or light-emitting diodes such as superluminescent light-emitting diodes (SLEDs) configured for emitting diverging light beams at red, green, and blue wavelengths. The solid-state light source subassembly 102 further includes a folded-beam optical element 106 or another collimator for collimating the color channel light. To collimate and/or focus the light, the folded-beam optical element 106 may include at least one surface 108 having optical power, i.e. collimating or focusing ability. In each of the light engines 151 and 152, the solid-state light source subassembly 102, and the folded-beam optical element 106 may be disposed on a common substrate 109 as shown, or supported separately.

The folded-beam optical element 106 is optically coupled to the light source subassembly 102 for collimating the R, G, and B color channel light to obtain a collimated light beam 110. Note that a more conventional, non-folded collimating optical element, e.g. a lens, a mirror, etc., could also be used for this purpose. A MEMS scanner 160 is optically coupled to the folded-beam optical elements 106 of each one of the light engines 151, 152 for receiving and redirecting the collimated light beams 110 along directions A, B, and C as shown in FIG. 1A, towards an optional pupil replicator 114. As the MEMS scanner 160 scans the collimated light beams 110, the light engines 151 and 152 vary the optical power levels of the generated collimated light beams 110, forming an image in angular domain. The function of the pupil replicator 114 is to provide multiple laterally offset copies of the collimated light beams 110 redirected or scanned by the MEMS scanner 160. One can see from FIG. 1B that the collimated light beams 110 of the light engines 151, 152 impinge onto the MEMS scanner 160 at different angles of incidence.

Figure 2A:
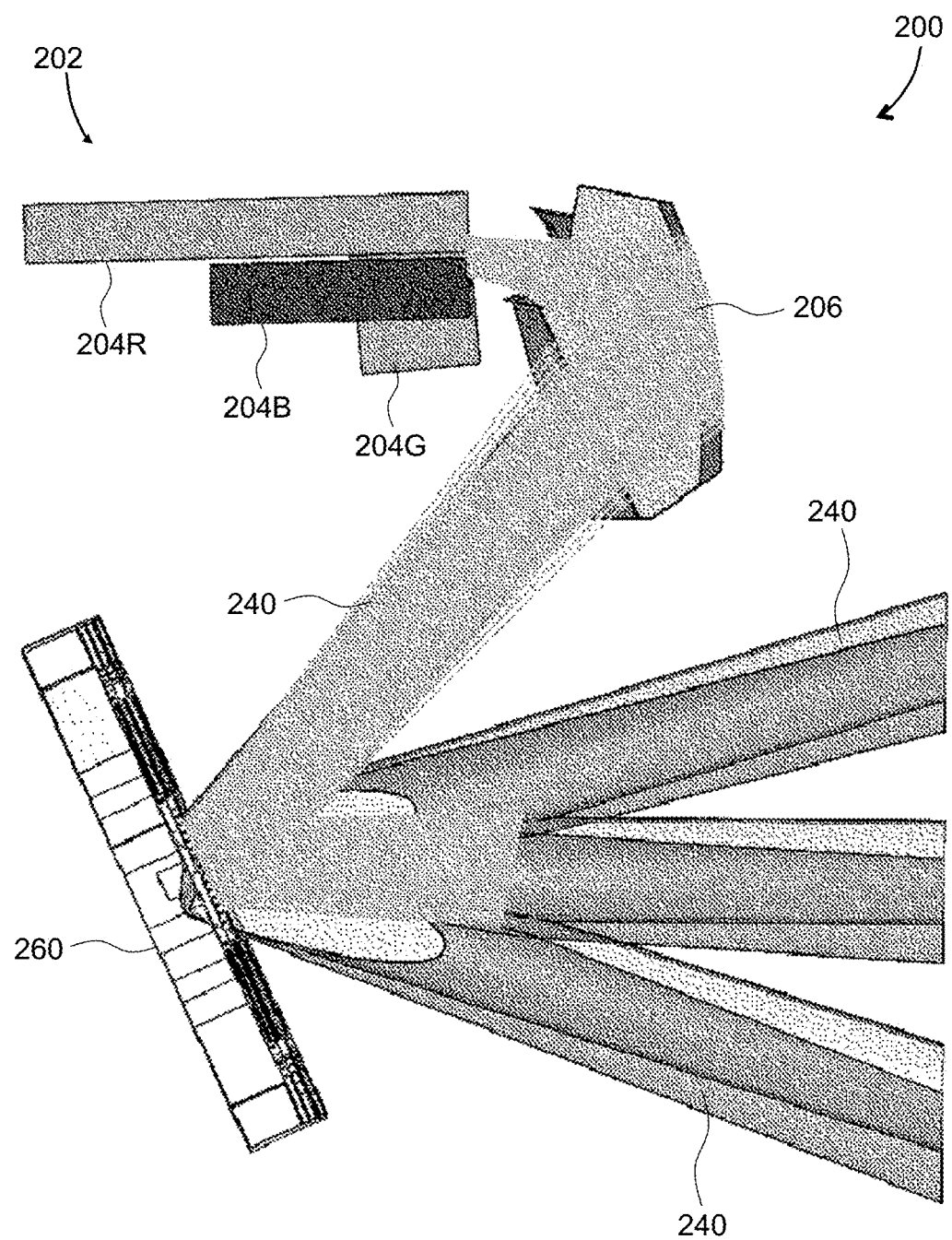
FIGS. 2A and 2B are solid-model ray-trace views of the scanning projector display of FIGS. 1A and 1B, showing one light engine.
Figure 2B:
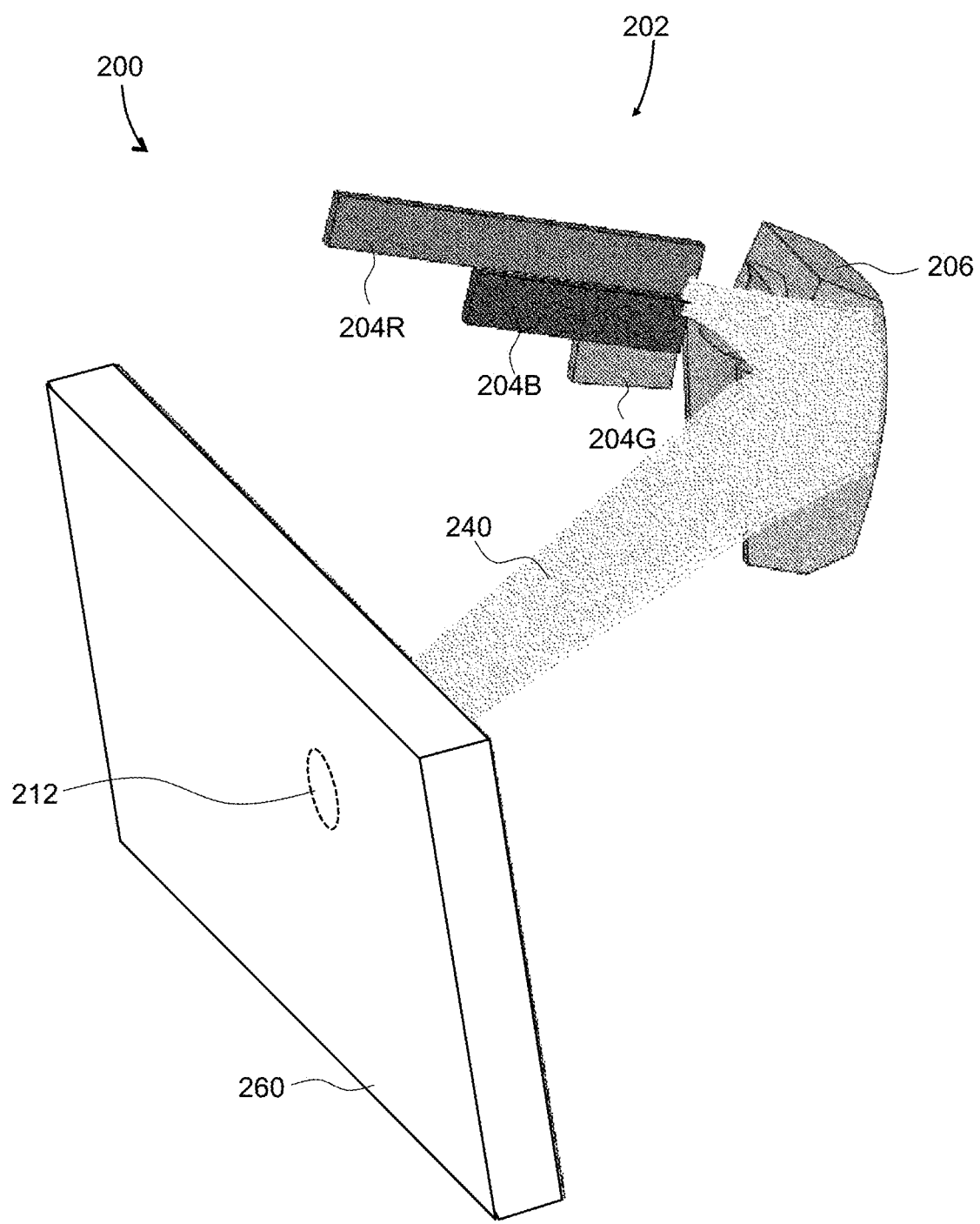

Referring to FIGS. 2A and 2B, a scanning projector display 200 is an embodiment of the scanning projector display 100 of FIGS. 1A and 1B. The scanning projector display 200 includes a plurality of light engines, each light engine including a light source subassembly 202 optically coupled to a folded-beam optical element 206. A 2D MEMS scanner 260 is optically coupled to the folded-beam optical elements 206 of each light engine. Only one light engine is shown for brevity. The light source subassembly 202 includes a plurality of SLED arrays 204R, 204G, and 204B each for providing a plurality of light beams of a particular color channel, i.e. red, green, and blue color channel, respectively. The SLED arrays 204R, 204G, and 204B may be disposed in a stack configuration, with their light-emitting end facets facing the folded-beam optical element 206 as shown. The stack configuration allows the output light beams to be closely spaced, which reduces the required input pupil size of the folded-beam optical element 206.

The folded-beam optical element 206 may have at least one surface having optical power, i.e. collimation/focusing power. The surface having optical power may be a refractive surface or a reflective surface, for example. The surfaces of the folded-beam optical element 206 may include off-center surfaces, anamorphic surfaces, freeform surfaces, etc. Typically, the folded-beam optical element 206 may have two or three such surfaces, although it may include more surfaces if needed. The 2D MEMS scanner 260 may include a tiltable mirror 212 (FIG. 2B). The mirror may be tiltable about X and Y axes, for scanning an optical beam 240 in X and Y directions. The tiltable mirror 212 may be operated near or at resonance for both X and Y oscillations, i.e. may be a biresonant mirror. The biresonant oscillation enables one to save energy while quickly scanning across the entire scanning range in both X and Y directions.

Figure 3:
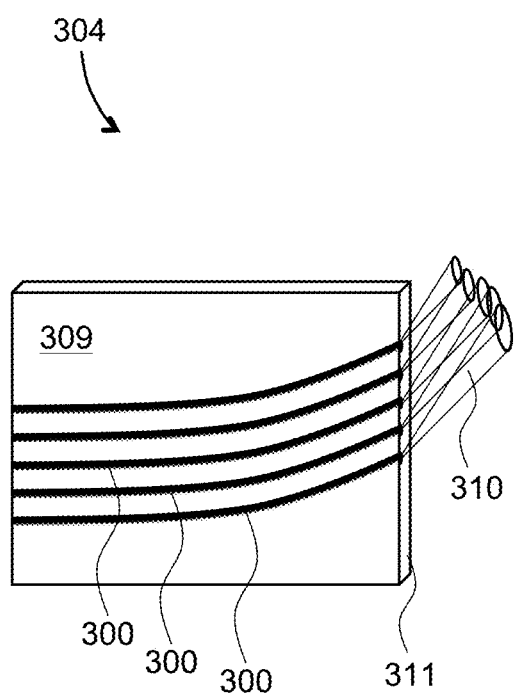
FIG. 3 is a schematic 3D view of superluminescent light-emitting diode (SLED) array chip.

Referring to FIG. 3, a side-emitting semiconductor chip 304 is an example implementation of SLED arrays 204R, 204G, and 204B of FIGS. 2A and 2B. The side-emitting semiconductor chip 304 includes a semiconductor substrate 309 and a plurality of SLED ridge emitter structures 300 supported by the semiconductor substrate 309. The SLED ridge emitter structures 300 emit light 310 at an end facet 311 of the semiconductor substrate 309 at an acute angle to the end facet 311 to suppress backreflection which would turn the SLED ridge emitter structures 300 into laser diodes. It may be convenient to configure the SLED ridge emitter structures 300 to emit the light 310 at a same wavelength, or at different wavelengths of a same color channel. During scanning by a scanner of a projector display, each SLED ridge emitter structure 300 emits light corresponding to a pixel of an image to be displayed, enabling the pixels corresponding to different SLED ridge emitter structures 300 to be displayed simultaneously. This may reduce the time required to display one image frame, improve spatial resolution of the display, or both. Furthermore, the SLED ridge emitter structures 300 may be used to provide redundancy of the light source, thereby improving achievable optical power levels and/or reliability of the light source.

Figure 4A:
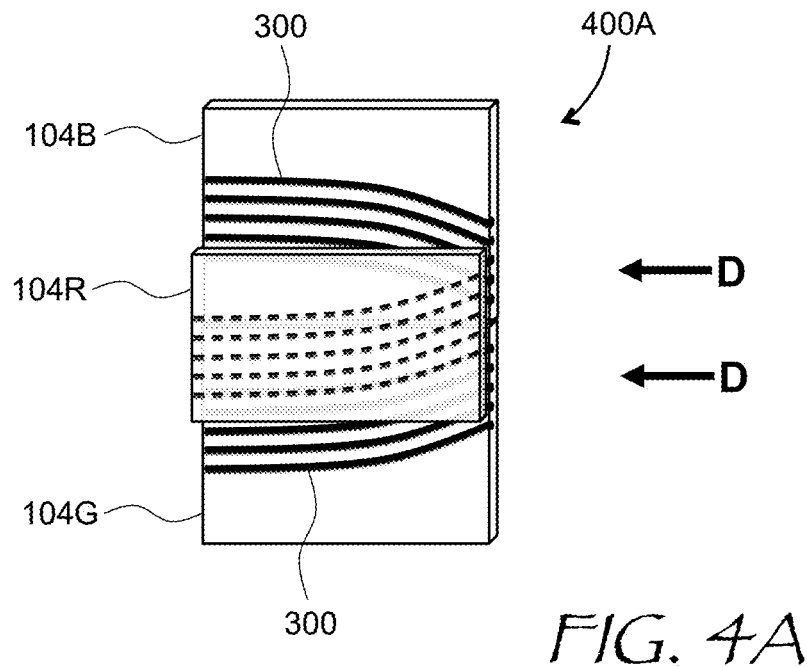
FIG. 4A is a schematic 3D view of a light source subassembly including three superimposed SLED array chips.
Figure 4B:
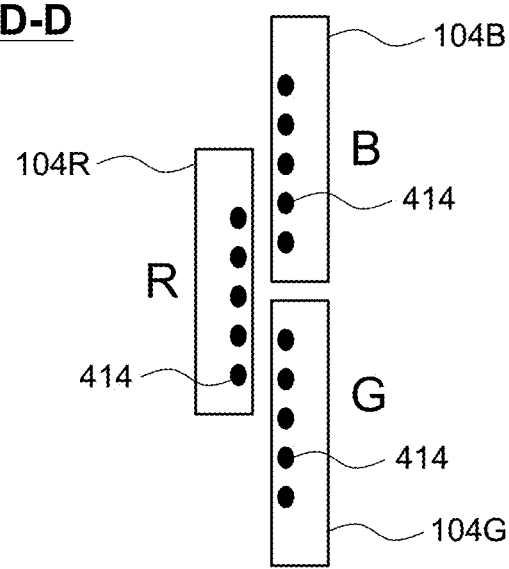
FIG. 4B is a frontal view of the light source subassembly of FIG. 4A as viewed along arrows D-D in FIG. 4A.

Turning to FIGS. 4A and 4B, a light source subassembly 400A includes a stack of the red color channel 104R, green color channel 104G, and blue color channel 104B semiconductor chips. In the light source subassembly 400A, the blue 104B and green 104G color channel semiconductor chips are disposed side-by-side, and the red color channel semiconductor chip 104 is disposed with its top surface proximate top surfaces of the two other chips 104B, 104G. Such a configuration enables the ridge emitter structures 300 to be disposed closer to each other. A close proximity of emitter cores 414, i.e. the close proximity of output beam waists, enables one to reduce the requirement on the input field diameter, or input pupil size, of the collimator, opening a path to reducing overall size of a light engine of a display.

Other configurations for the red color channel 104R, green color channel 104G, and blue color channel 104B semiconductor chips are possible. For example, the red color channel 104R, green color channel 104G, and blue color channel 104B semiconductor chips may be disposed in a stack-of-three configuration, e.g. with green color channel semiconductor chip 104G sandwiched between the red color channel 104R and blue color channel 104B semiconductor chips. The ridge emitter structures 300 of all three semiconductor chips may include a turn in a same direction, e.g. all upwards, or all downwards, to make sure that the output beams are emitted in a same or similar directions, e.g. all upwards as shown in FIG. 3, or downwards.

Figure 4C:
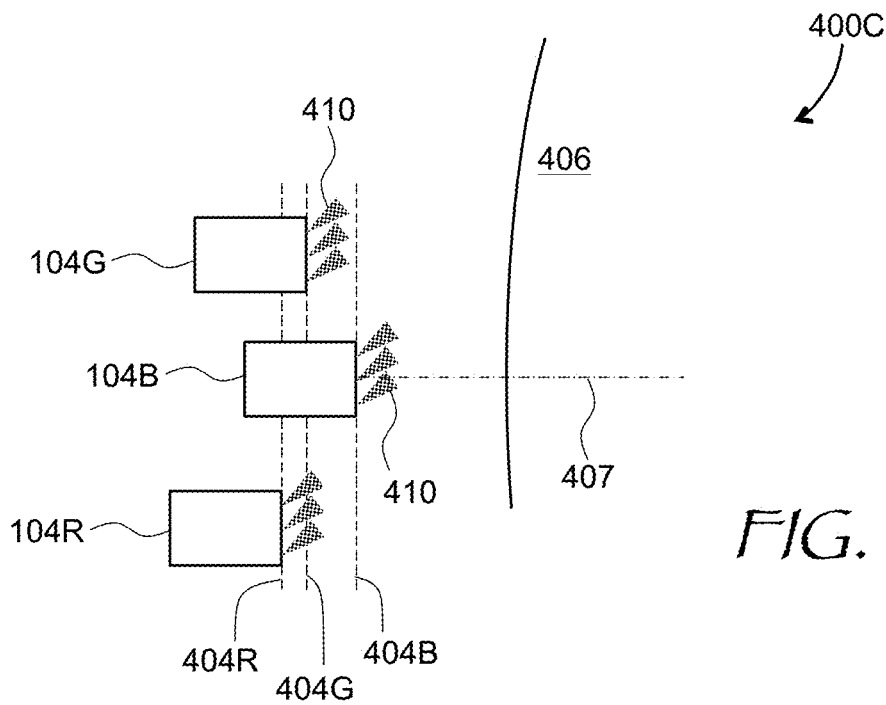
FIG. 4C is a top view of a light engine embodiment including three SLED array chips at different distances from a collimator for compensating the collimator's chromatic aberration.

Referring to FIG. 4C, a light engine 400C includes the red color channel semiconductor chip 104R, the green color channel semiconductor chip 104G, and the blue color channel semiconductor chip 104B optically coupled to a common collimator 406 having an optical axis 407. Light-emitting end facets of the red color channel 104R, the green color channel 104G, and the blue color channel 104B semiconductor chips emit diverging light beams 410 of different colors. The light-emitting end facets of the three chips 104R, 104G, 104B are disposed at different axial distances from the collimator 406. In other words, the light-emitting facets are disposed at different axial planes: a red color channel axial plane 404R for the red color channel semiconductor chip 104R, a green color channel axial plane 404G for the green color channel semiconductor chip 104G, and a blue color channel axial plane 404B for the blue color channel semiconductor chip 104B.

In some embodiments, the axial distances for different color channels are selected so as to offset chromatic aberration of the collimator 406, which may manifest as a dependence of a focal length of the collimator 406 on wavelength, resulting in different focal lengths for light of different color channels. For example, when the collimator 406 has a shorter focal length for blue (B) color channel than for red (R) and green (G) color channels, and a shorter focal length for the G color channel than for the R color channel, the semiconductor chips 104R, 104G, 104B may be disposed as shown in FIG. 4C, where the B color channel semiconductor chip 104B is the closest to the collimator 406 and the R color channel semiconductor chip 104R is the farthest. Of course, the order of the semiconductor chips 104R, 104G, and 104B may be different than shown, depending on the actual chromatic aberration of the collimator 406, which in its turn depends on the configuration, type, and material properties of the collimator 406.

Figure 4D:
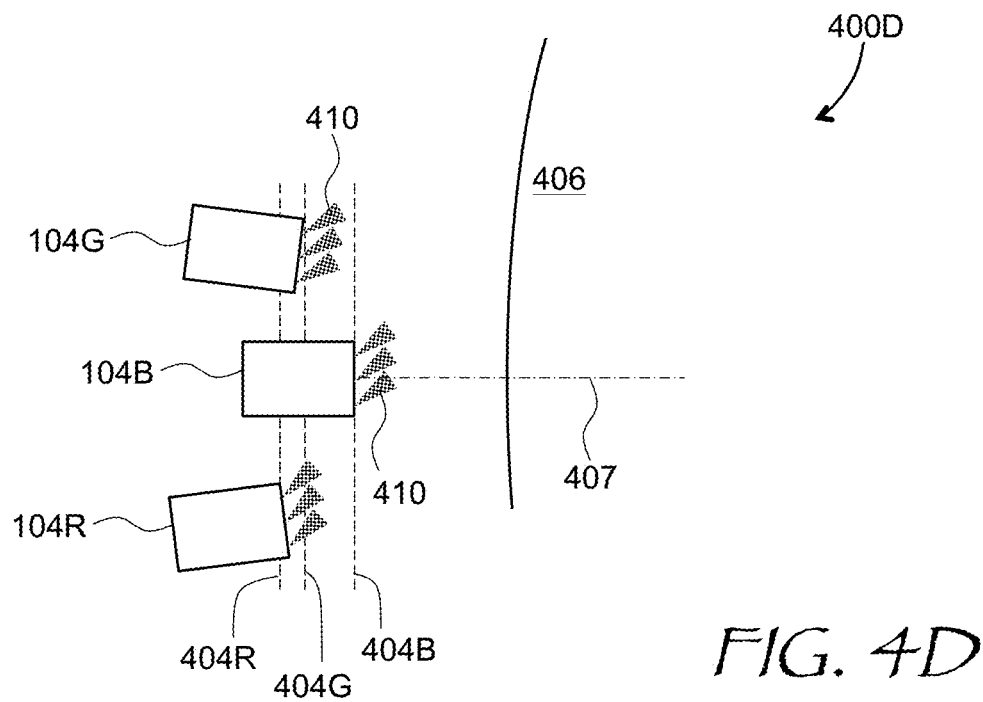
FIG. 4D is a top view of a light engine embodiment including three SLED array chips pointing at the collimator's entrance pupil.

Turning to FIG. 4D, a light engine 400D is an embodiment of the light engine 400C of FIG. 4C. The light engine 400D of FIG. 4D includes the red color channel semiconductor chip 104R, the green color channel semiconductor chip 104G, and the blue color channel semiconductor chip 104B optically coupled to the collimator 406 having the optical axis 407. Light-emitting end facets of the red color channel 104R, green color channel 104G, and blue color channel 104B semiconductor chips, emitting diverging light beams 410 of different colors, are oriented at different angles w.r.t the optical axis 407 of the collimator 406, so as to direct their light beams to a clear aperture of the collimator 406. This may enable reduction of the clear aperture of the collimator 406, further reducing size, weight, and cost of the collimator 406.

Figure 5:
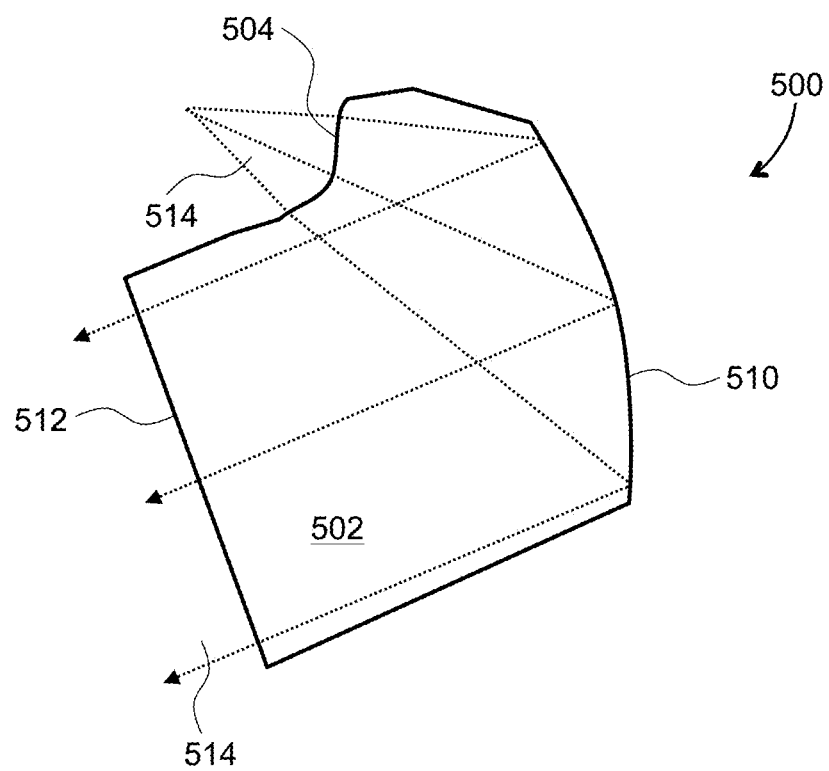
FIG. 5 is a top cross-sectional view of a folded-beam optical element of the scanning projector display of FIG. 1.

Turning to FIG. 5, a folded-beam optical element 500 is an embodiment of the folded-beam optical element 106 of FIG. 1, or the collimator 406 of FIGS. 4C and 4D. The folded-beam optical element 500 of FIG. 5 includes a block 502 of transparent material such as glass or plastic. The block 502 may be a single monolithic block e.g. by injection molding, or may be composed of several elements joined together e.g. epoxied or optical-contacted. By way of a non-limiting example, the block 502 may include a curved refractive surface 504, a curved reflective surface 510, and a flat refractive surface 512. Curved optical surfaces may be concave as shown, or convex. Herein, the term "concave" or "convex" is defined w.r.t. an impinging optical beam 514. When the optical beam 514 is impinging from inside the folded-beam optical element 500, a concave surface might appear convex from the outside.

The optical beam 514 first impinges onto the curved (concave) refractive surface 504, then propagates to the curved (concave) reflective surface 510, which provides most of the collimation of the optical beam 514. The shape and position of the refractive 504, 512 and reflective 510 surfaces of the folded-beam optical element 500 may be optimized e.g. using an optical design software to provide a high input NA and reduce optical aberrations. More refractive or reflective surfaces may be provided as required to meet the optical specification.

Figure 6:
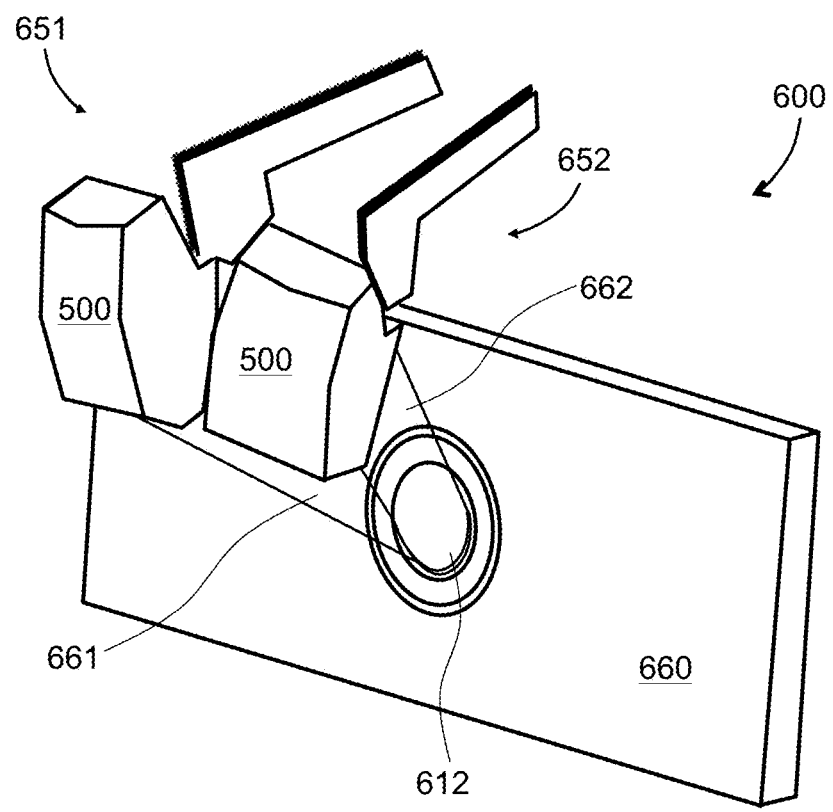
FIG. 6 is an isometric view of a scanning projector display having two light engines.

Referring to FIG. 6, a scanning projector display 600 includes a plurality of light engines 651, 652 configured for providing collimated light beams 661, 662 respectively. Each light engine 651, 652 may include a solid-state light source subassembly coupled to a collimator, similarly to the light engines 151, 152 of FIG. 1, and the light engines 400C and 400D of FIGS. 4C and 4D, respectively. The light source subassembly may include SLED chips for different color channels configured and mounted as described above. The collimator may include the folded-beam optical element 500, as shown in this example.

A MEMS scanner 660 is configured and disposed to receive the collimated light beams 661, 662 at a 2D tiltable reflector 612. The collimated light beams 661, 662 are emitted by the light engine 651, 652, respectively. The collimated light beams 661, 662 impinge onto the tiltable MEMS reflector 612 at different angles of incidence due to their physical separation from one another over the MEMS substrate 660. More than two light engines may be provided. The multiple light engines may be disposed side-by-side in an arc configuration, for example.

Figure 7:
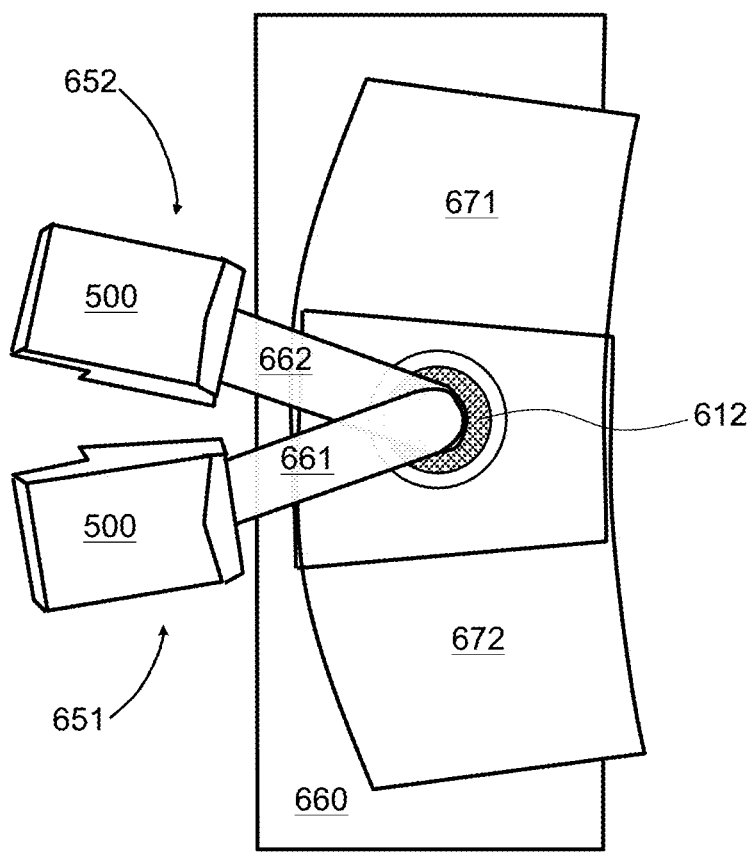
FIG. 7 is a top view of the scanning projector display of FIG. 6.

FIG. 7 illustrates fields of view generated by the collimated light beams 661, 662, when the collimated light beams 661, 662 are scanned by the tiltable reflector 612 of the MEMS scanner 660. The first light engine 651 emits the first collimated light beam 661, which propagates upwards in FIG. 7. The second light engine 652 emits the second collimated light beam 662, which propagates downwards. The tiltable reflector 612 is a 2D tiltable mirror with a nominal, or center, tilt angle of 0 degrees w.r.t. the MEMS substrate 660. Herein, the term "2D tiltable" means independently tiltable about two non-parallel axes.

In operation, the tiltable reflector 612 scans the first collimated light beam 661 within a scanning range 671, which is shifted upwards in FIG. 7 due to the impinging first collimated light beam 661 propagating upwards. The second light engine 652 emits the second collimated light beam 662, which propagates downwards. The tiltable reflector 612 scans the second collimated light beam 662 within a scanning range 672, which is shifted downwards due to the impinging second collimated light beam 662 propagating downwards in FIG. 7. Herein, the term "scanning range" means range of output angles of image-forming light beams when scanned by a scanner, e.g. when reflected from the tiltable reflector 612 of the MEMS scanner 660. Each scanning range 671, 672 is associated with a corresponding field of view. When the scanning ranges 671, 672 overlap, the two fields of view also overlap.

Figure 8:
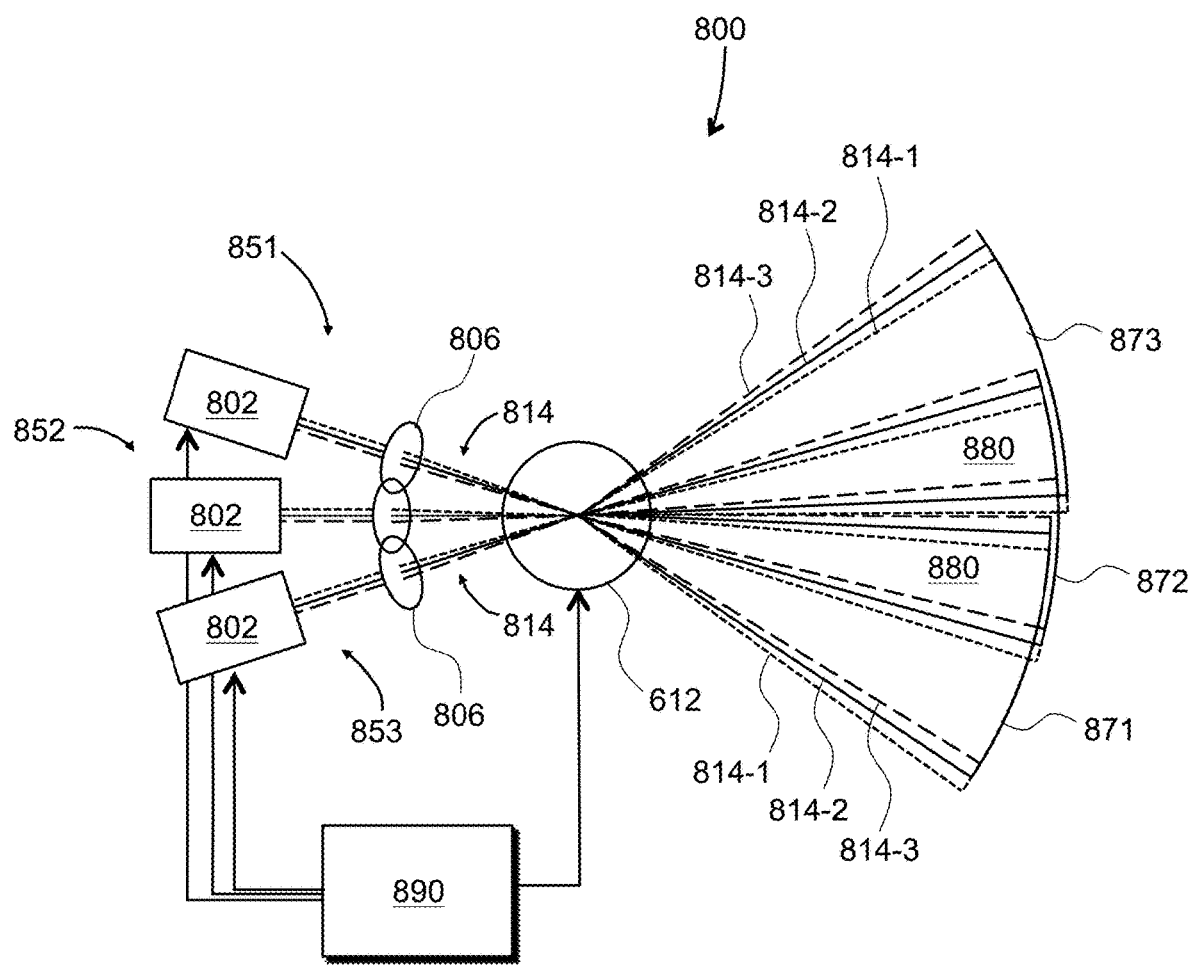
FIG. 8 is a schematic top view of a scanning projector display having multiple light engines, showing field of view portions corresponding to each light engine.

The relationship between the fields of view originating from different light engines is further illustrated in FIG. 8. A scanning projector display 800 of FIG. 8 includes three light engines, a first light engine 851, a second light engine 852, and a third light engine 853. Each light engine 851, 852, 853 includes a light source subassembly 802, e.g. the light source subassembly 202 including a stack of SLED arrays 204R, 204G, and 204B (FIGS. 2A and 2B), or the light source subassembly 400A including a stack of the red color channel 104R, green color channel 104G, and blue color channel 104B semiconductor chips (FIGS. 4A and 4B). The light source 802 is coupled to a collimator 806, e.g. the folded-beam optical element 500 of FIGS. 5A and 5B.

In operation, collimated light beams 814 emitted by the light engines 851, 852, and 853 (only chief rays are shown) impinge onto the tiltable reflector 612 at different angles of incidence, as illustrated. The tiltable reflector 612 scans all collimated light beams 814 together, forming first 871, second 872, and third 873 fields of view, respectively. In some embodiments, a difference between angles of incidence of the collimated light beams 814 provided by two neighboring light engines, i.e. 851 and 852 or 852 and 853, at the tiltable MEMS reflector 612 is such that overlaps 880 exist between the fields of view provided by each one of the two neighboring 851 and 852; or 852 and 853 light engines. The areas of overlaps 880 between the first 871 and second 872; and/or between the second 872 and third 873 fields of view may be used to increase optical resolution in the field of the overlap, and/or to provide pixel redundancy in the field of the overlap. In some embodiments, the overlap may be at least 10%; at least 40%; or at least 70% of the field of view provided by each one of the two 851 and 852; or 852 and 853 light engines. When the tilt angle range of the tiltable reflector 612 is large enough, all three fields of view 871, 872, and 873 may overlap.

It is further noted that each light beam 814 emitted by the light engine 851, 852, or 853 may include a plurality of sub-beams emitted by individual emitters and/or individual emitter chips of the corresponding light source subassemblies. Three such sub-beams are shown in FIG. 8 for each light beam 814 for the purpose of illustration and example: a first sub-beam 814-1 (dotted line), a second sub-beam 814-2 (solid line), and a third sub-beam 814-3 (dashed line).

The scanning ranges and related fields of view will also be slightly different for the individual emitters and/or individual emitter chips. The difference between the scanning angles can be taken into account by suitably configuring a controller 890 to send corresponding signals to the light engines 851, 852, 853 in coordination with operating the tiltable reflector 612. The controller 890 may be configured to energize the light source subassemblies 802 of each light engine 851, 852, 853 with a delay corresponding to a difference of the angles of incidence of the corresponding collimated light beams 814 onto the tiltable reflector 612. The tiltable reflector 612 may be a one-dimensional (1D) or two-dimensional (2D) tiltable mirror. Furthermore, two 1D tiltable mirrors may be optically coupled e.g. via a pupil relay to provide 2D scanning.

Figure 9:
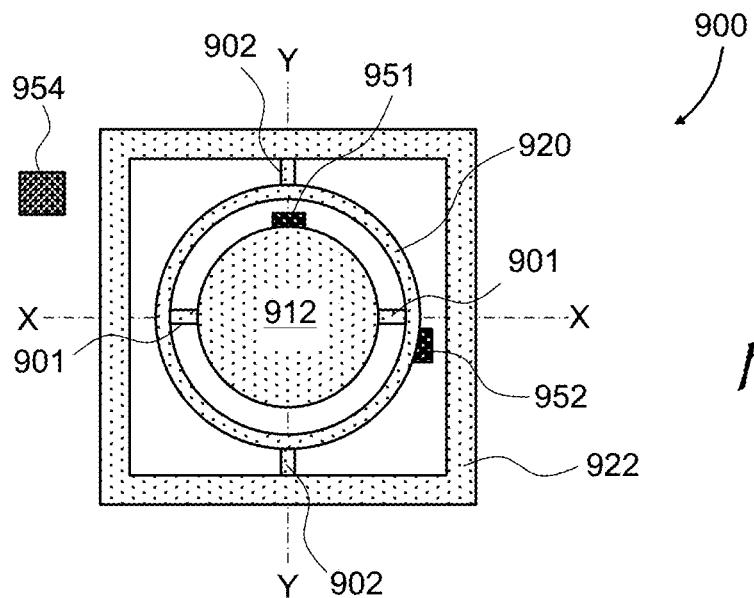
FIG. 9 is a plan view of a 2D microelectromechanical system (MEMS) scanner in accordance with the present disclosure.

Referring to FIG. 9, a two-dimensional (2D) microelectromechanical (MEMS) scanner 900 includes a tiltable reflector 912 supported by a pair of first torsional hinges 901 allowing tilting the tiltable reflector 912 about X axis. The first torsional hinges 901 extend from the tiltable reflector 912 to a gimbal ring 920, which is supported by a pair of second torsional hinges 902 extending from the gimbal ring 920 to a fixed base 922, for tilting of the gimbal ring 920 and the tiltable reflector 912 about Y axis. First 951 and second 952 actuators may be disposed underneath the tiltable reflector 912 and/or the gimbal ring 920 for providing a force for actuating the tilt of the tiltable reflector 912 about X and Y axes, respectively. The actuators 951, 952 may be electrostatic, electro-magnetic, piezo-electric, etc. For electrostatic mirror actuation, a comb drive may be provided on the tiltable reflector 912 and/or the gimbal ring 920. The tiltable reflector 912 may include a metallic and/or a dielectric mirror surface, for example.

A feedback circuit 954 may be provided for determining the X- and Y-angles of tilt of the tiltable reflector 912. The feedback circuit 954 may measure electric capacitance between the first actuator 951 and the tiltable reflector 912 to determine the X-tilt, and electric capacitance between the second actuator 952 and the gimbal ring 920 to determine the Y-tilt. Separate electrodes may also be provided specifically for the feedback circuit 954. In some embodiments, the feedback circuit 954 may provide a sync or triggering pulses when the tiltable reflector 912 is tilted at a certain X- and/or Y-angle. The sync or triggering pulses may be used to determine the tilt angles of the tiltable reflector 912 e.g. by extrapolating from the timing of the latest triggering pulses.

Figure 10:
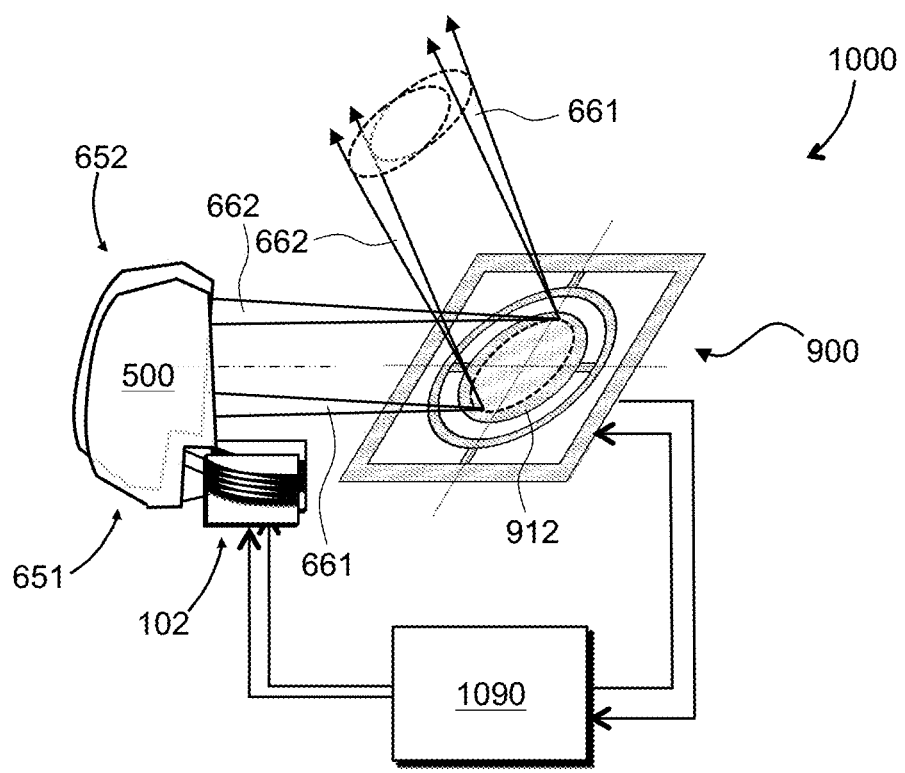
FIG. 10 is a schematic view of a projector display embodiment including the 2D MEMS scanner of FIG. 9 and a pair of light engines.

Turning to FIG. 10, a scanning projector display 1000 includes the plurality of light engines 651, 652 configured for providing collimated light beams 661, 662 respectively. Each light engine 651, 652 include a solid-state light source subassembly 102 coupled to the folded-beam optical element 500 performing a function of a collimator, similarly to the light engines 151, 152 of FIG. 1, and the light engines 400C and 400D of FIGS. 4C and 4D, respectively. Each solid-state light source subassembly 102 may include a substrate, e.g. a semiconductor chip substrate, supporting a plurality of semiconductor light sources for providing the plurality of optical beams at an end facet of the substrate. For example, each solid-state light source subassembly 102 may include one or more side-emitting semiconductor chips 304 (FIG. 3) e.g. SLED chips, for different color channels configured and mounted e.g. as described with reference to FIGS. 4A to 4D above. Collimators of other types, e.g. refractive (lens-based), reflective (mirror-based), etc., may be used in place of the folded-beam optical elements 500.

The tiltable reflector 912 of the MEMS scanner 900 is optically coupled to the folded-beam optical elements 500 of the light engines 651, 652 (FIG. 10) to receive and scan the respective collimated light beams 661, 662. A controller 1090 is operably coupled to the solid-state light source subassemblies 104 and the MEMS scanner 900. The controller 1090 may be configured to provide control signals to individual SLEDs of each solid-state light source subassembly 102 in coordination with operating the tiltable reflector 912 to angularly scan the collimated light beams 661, 662 while adjusting the brightness or optical power levels of the collimated light beams 661, 662 to raster an image in angular domain.

The controller 1090 may receive sync signals from the MEMS scanner 900 indicating a pre-determined angles of tilt of the tiltable reflector 912 and compute from the timing of the sync signals the present and/or future tilt angles of the tiltable reflector 912, thus determining the angular trajectory of the tiltable reflector 912. Then, the controller 1090 may energize the solid-state light source subassemblies 104 of the light engines 651 and 652 with time delays corresponding to the predicted tilt angles of the tiltable reflector 912 and the required brightness and color of the displayed image pixels corresponding to the predicted angular trajectory of the tiltable reflector 912. In this manner, the power levels of semiconductor chips emitting light of different color channels may be varied to provide a color image. When viewed by a human eye, the image in angular domain is projected by the eye's cornea and retina to become a spatial-domain color image on the eye's retina. It is noted that the absence of a display panel or an intermediate screen in the scanning projector display 1000 enables a considerable size and weight reduction of the scanning projector display 1000.

Figure 11:
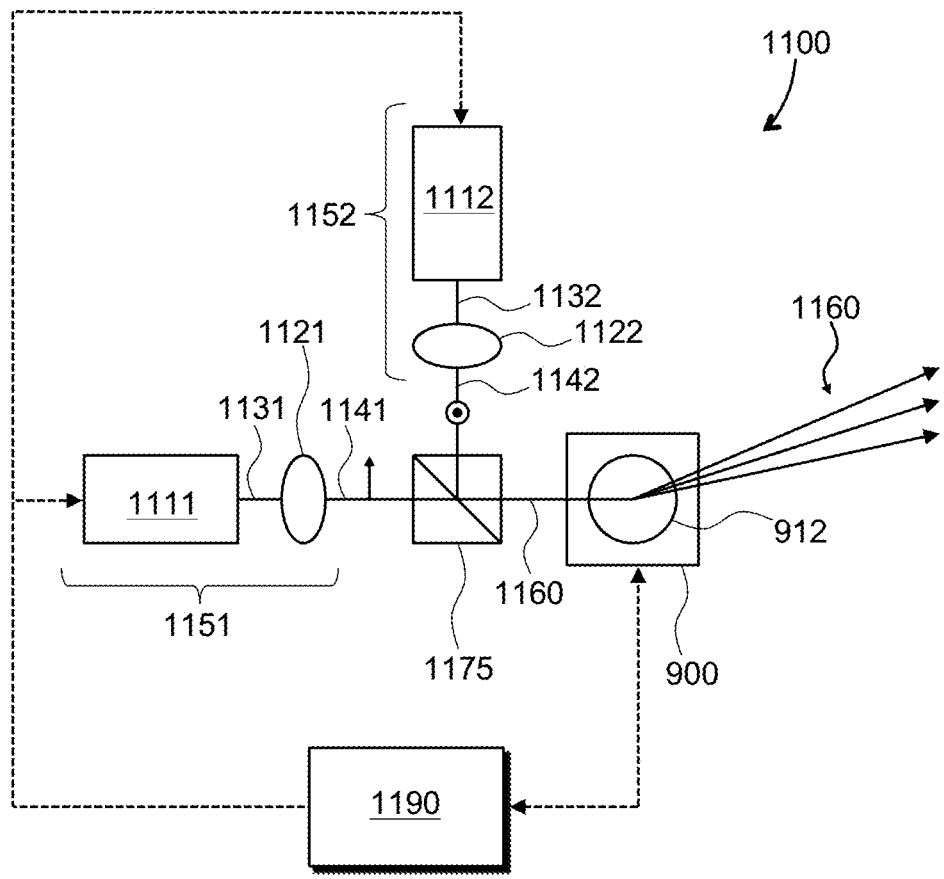
FIG. 11 is a schematic view of projector display embodiment including two light engines and a polarization combiner.

Referring now to FIG. 11, a scanning projector display 1100 includes first 1151 and second 1152 light engines, a polarization beam combiner 1175, and the MEMS scanner 900. The first light engine 1151 includes a first light source subassembly 1111, e.g. the light source subassembly 202 of FIGS. 2A and 2B including a stack of SLED arrays 204R, 204G, and 204B, or the light source subassembly 400A of FIGS. 4A and 4B including a stack of the red color channel 104R, green color channel 104G, and blue color channel 104B semiconductor chips (FIGS. 4A and 4B). The first light subassembly 1111 is optically coupled to a first collimator 1121 (FIG. 11), e.g. a lens and/or the folded-beam optical element 500 of FIGS. 5A and 5B. In operation, the first light source subassembly 1111 provides a first diverging light beam 1131 to the first collimator 1121, which collimates the first diverging light beam 1131 providing a first collimated light beam 1141. The first collimated light beam 1141 has a first polarization, i.e. in plane of FIG. 11 as indicated with an arrow. The first diverging light beam 1131 may include a plurality of sub-beams corresponding to individual laterally offset emitters of the light-emitting semiconductor chips of the first light source subassembly 1111. Accordingly, the first collimated light beam 1141 includes a plurality of collimated sub-beams propagating at slightly different angles.

A second light engine 1152 is similar to the first light engine 1151 in that it includes a second light source subassembly 1112 for providing a second diverging light beam 1132 optically coupled to a second collimator 1122 for collimating the second diverging light beam 1132 to provide a second collimated light beam 1142. The second light source subassembly 1112 may also include a plurality of light-emitting semiconductor chips, which may correspond to different color channels and may include multiple emitters each. The second collimated light beam 1142 has a second polarization, e.g. perpendicular to the plane of FIG. 11 as shown. The second polarization is orthogonal to the first polarization. The first 1141 and second 1142 collimated light beams may be polarized using a dedicated external polarizers, or they may remain polarized when emitted at corresponding mutually orthogonal polarizations.

The polarization beam combiner 1175 is configured for receiving the first 1141 and second 1142 collimated light beams and combining the first 1141 and second 1142 collimated light beams into an output beam 1160. The polarization beam combiner 1175 may be based on a polarization-selective dielectric coating, a polarizing birefringent prism, etc. The tiltable reflector 912 of the MEMS scanner 900 receives the output beam 1160 and reflects the output beam 1160 at time-varying angles, scanning the output beam 1160 to form an image in angular domain. The polarization beam combiner 1175 can be used for cases where the light sources are well-polarized, i.e. have a high degree of polarization, e.g. linear, circular, etc. Light sources such as SLEDs or lasers often have a high degree of polarization.

A controller 1190 may be operably coupled to the first 1111 and second 1112 light source subassemblies and the MEMS scanner 900. The controller 1190 may be configured to scan the tiltable reflector 912 of the MEMS scanner 900 over a scanning range in coordination with energizing the first 1111 and second 1112 light source subassemblies in coordination with tilting the tiltable reflector 912 for displaying the image in angular domain.

In some embodiments, the angles of incidence of the first 1141 and second 1142 collimated light beams of the output beam 1160 are equal. For such embodiments, the first 1111 and second 1112 light source subassemblies may provide redundancy in displaying individual pixels of the image, and/or provide different color channels of a same image. In some embodiments, the angles of incidence of the first 1141 and second 1142 collimated light beams of the output beam 1160 are slightly different, such that the images provided by the first 1111 and second 1112 light source subassemblies include interlaced pixels. For example, the first light source 1111 may generate even columns and/or rows of pixels, and the second light source 1112 may generate odd columns and/or rows of pixels, or vice versa. This enables one to effectively double the spatial resolution of the image being displayed. Furthermore, in some embodiments, the angles of incidence of the first 1141 and second 1142 collimated light beams of the output beam 1160 are adjacent one another, such that the images provided by the first 1111 and second 1112 light source subassemblies are adjacent. For instance, referring back to FIG. 8, the light engines 851, 852, and 853 may be disposed at larger angular offsets than shown, such that the areas of overlap 880 disappear. The light engines 851, 852, and 853 may also be disposed on top of one another, such that respective FOVs 871, 872, and 873 are disposed one under another.

Figure 12:
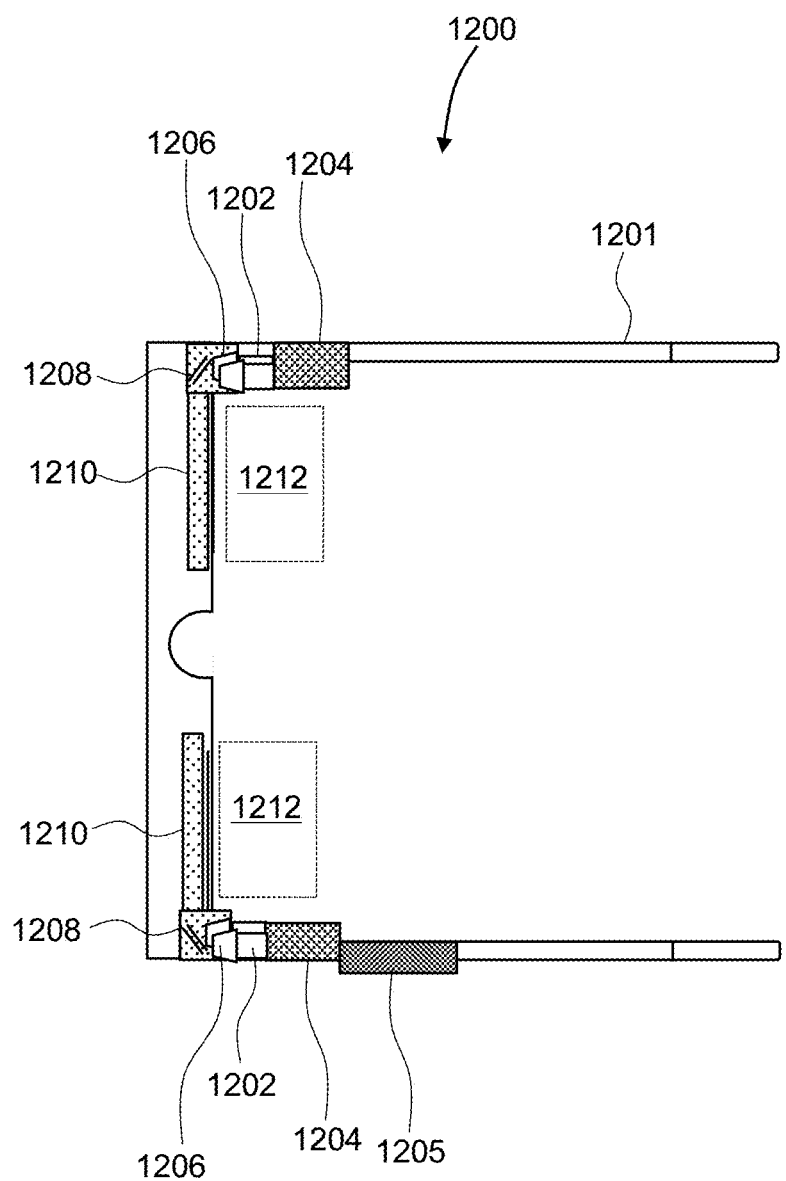
FIG. 12 is a schematic top view of a near-eye display including projector displays of the present disclosure.

Turning to FIG. 12, a near-eye display 1200 includes a frame 1201 having a form factor of a pair of glasses. The frame 1201 supports, for each eye: a plurality of light engines each including a light source subassembly 1202 and a collimator 1206 optically coupled to the corresponding light source subassembly 1202 for collimating the light beam(s) emitted by the corresponding light source subassembly 1202, an electronic driver 1204 operably coupled to the light source subassemblies 1202 for powering the light source subassemblies 1202, a scanner 1208, e.g. the MEMS scanner 900 of FIG. 9, optically coupled to the collimator 1206, and a pupil replicator 1210 optically coupled to the scanner 1208. The light source subassemblies 1202 may each include a substrate supporting an array of single-mode or multimode semiconductor light sources, e.g. side-emitting laser diodes, vertical-cavity surface-emitting laser diodes, SLEDs, or light-emitting diodes, for providing a plurality of light beams. The collimators 1206 may include concave mirrors, bulk lenses, Fresnel lenses, holographic lenses, etc., and may be integrated with the light source subassemblies 1202. The scanners 1208 may include tiltable mirrors. The pupil replicators 1210 may include waveguides equipped with a plurality of surface relief and/or volume holographic gratings. The function of the pupil replicators 1210 is to provide multiple laterally offset copies of the light beams redirected or scanned by the scanners 1208 at eyeboxes 1212.

A controller 1205 is operably coupled to the scanners 1208 and the electronic drivers 1204. The controller 1205 may be configured to determine the X- and Y-tilt angles of the tiltable reflectors of the scanners 1208. The controller 1205 determines which pixel or pixels of the image to be displayed correspond to the determined X- and Y-tilt angles. Then, the controller 1205 determines the brightness and/or color of these pixels, and operates the electronic drivers 1204 accordingly for providing powering electric pulses to the light source subassemblies 1202 to produce light pulses at power level(s) corresponding to the determined pixel brightness and color. In some embodiments, the controller 1205 is configured to implement a method described further below.

Figure 13:
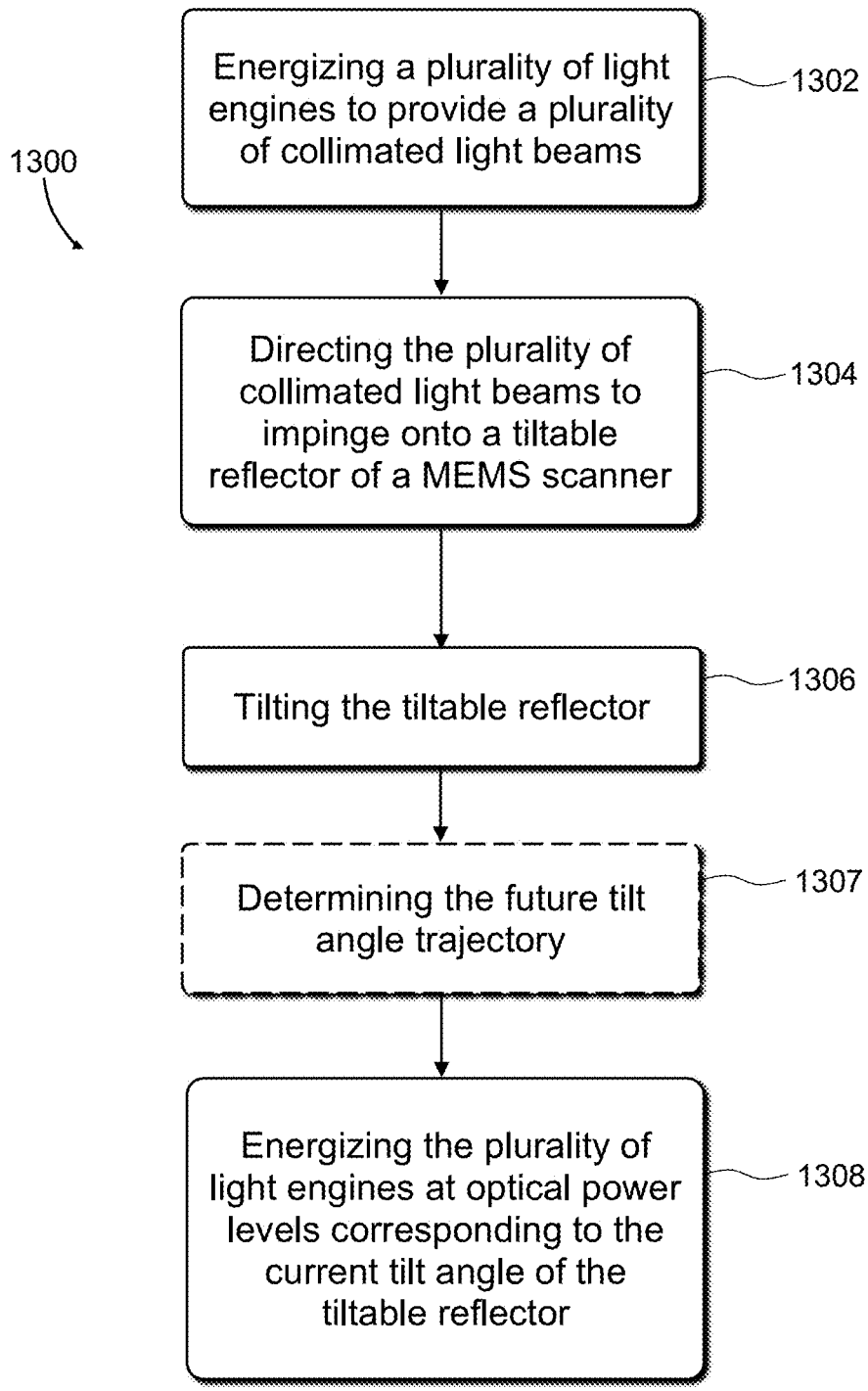
FIG. 13 is a flow chart of a method for displaying an image using a projector display of the present disclosure.

Referring to FIG. 13, a method 1300 for displaying an image includes energizing (1302) a plurality of light engines for providing a plurality of collimated light beams. For example, at least one solid-state light source, such as the side-emitting semiconductor chip 304 of FIG. 3, may be energized. A collimator, e.g. the folded-beam optical element 500 of FIGS. 5A and 5B, a freeform collimating optical element, a lens, etc., collimates the emitted light beam(s). The plurality of collimated light beams is directed (1304) to impinge onto a tiltable reflector of a MEMS scanner at different angles of incidence. The tiltable reflector of the MEMS scanner may then be tilted or scanned (1306) in coordination with the energizing the plurality of light engines (1308) at optical power levels and/or color(s) corresponding to the currently displayed pixel of the image, to display the image in angular domain, as explained above.

The light engines may be energized with a delay corresponding to a difference of the angles of incidence of the corresponding collimated light beams onto the tiltable reflector. The light engines may be energized to form different portions of the image to be displayed, i.e. to form different portions of the field of view of a scanning projector display. In areas of overlap of the portions of the field of view provided by different light engines, the pixel density of the image may be increased. Furthermore in embodiments involving a resonant or a biresonant MEMS scanner, the MEMS scanner may provide pulses at the moments of time when the tiltable reflector of the resonant or biresonant MEMS scanner is at a pre-defined tilt angle. In accordance some embodiments, a future tilt angle trajectory of the tiltable mirror may be determined (1307) and then the light engines may be energized in accordance with the determined present or future tilt angle trajectory.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 14A:
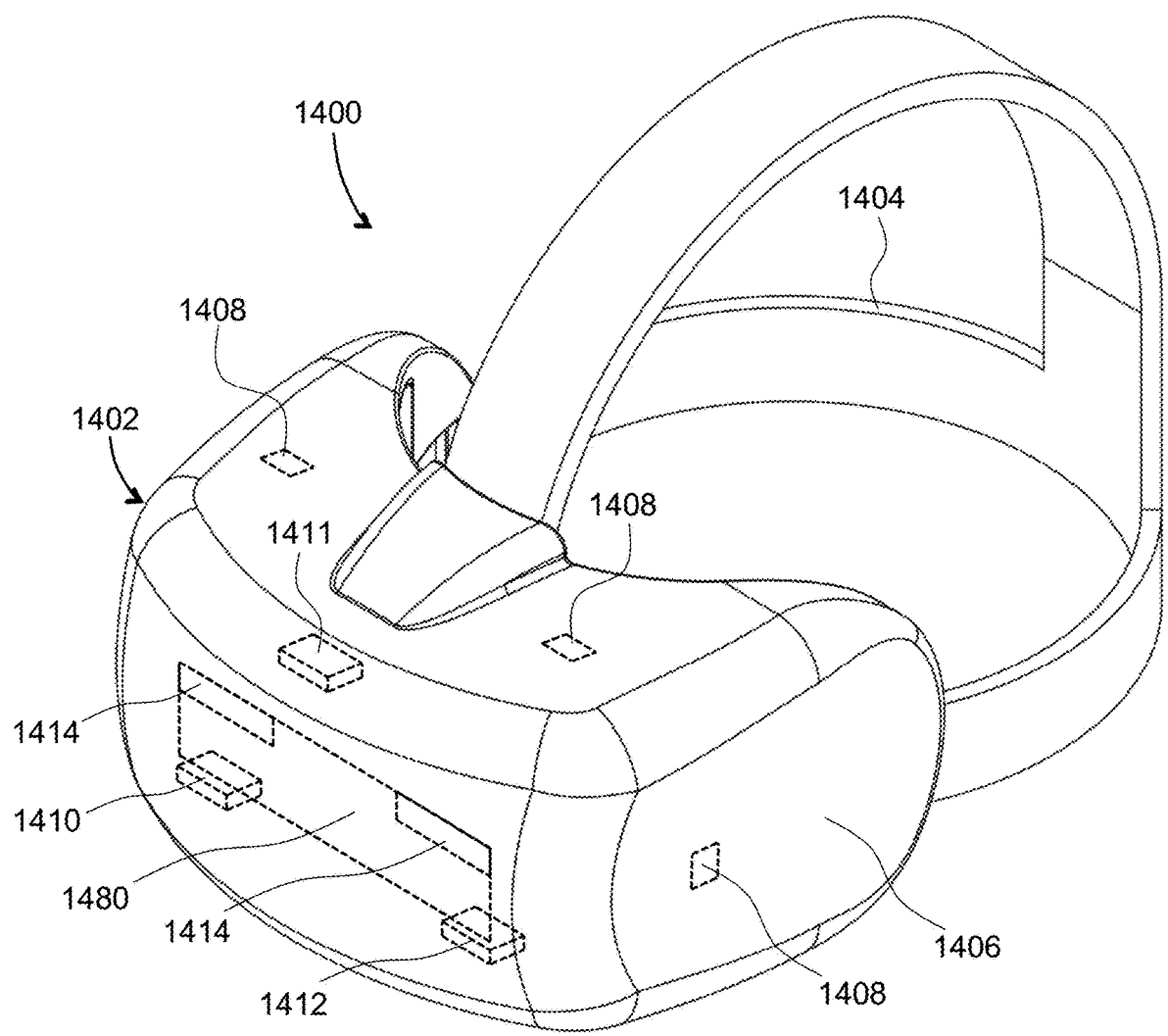
FIG. 14A is an isometric view of a head-mounted display of the present disclosure.

Referring to FIG. 14A, an HMD 1400 is an example of an AR/VR wearable display system which encloses the user's face, for a greater degree of immersion into the AR/VR environment. The HMD 1400 may include light sources and projector displays disclosed herein, e.g. multiple light engines coupled to a common beam scanner. The function of the HMD 1400 is to augment views of a physical, real-world environment with computer-generated imagery, and/or to generate the entirely virtual 3D imagery. The HMD 1400 may include a front body 1402 and a band 1404. The front body 1402 is configured for placement in front of eyes of a user in a reliable and comfortable manner, and the band 1404 may be stretched to secure the front body 1402 on the user's head. A display system 1480 may be disposed in the front body 1402 for presenting AR/VR imagery to the user. Sides 1406 of the front body 1402 may be opaque or transparent.

In some embodiments, the front body 1402 includes locators 1408 and an inertial measurement unit (IMU) 1410 for tracking acceleration of the HMD 1400, and position sensors 1412 for tracking position of the HMD 1400. The IMU 1410 is an electronic device that generates data indicating a position of the HMD 1400 based on measurement signals received from one or more of position sensors 1412, which generate one or more measurement signals in response to motion of the HMD 1400. Examples of position sensors 1412 include: one or more accelerometers, one or more gyroscopes, one or more magnetometers, another suitable type of sensor that detects motion, a type of sensor used for error correction of the IMU 1410, or some combination thereof. The position sensors 1412 may be located external to the IMU 1410, internal to the IMU 1410, or some combination thereof.

The locators 1408 are traced by an external imaging device of a virtual reality system, such that the virtual reality system can track the location and orientation of the entire HMD 1400. Information generated by the IMU 1410 and the position sensors 1412 may be compared with the position and orientation obtained by tracking the locators 1408, for improved tracking accuracy of position and orientation of the HMD 1400. Accurate position and orientation is important for presenting appropriate virtual scenery to the user as the latter moves and turns in 3D space.

The HMD 1400 may further include a depth camera assembly (DCA) 1411, which captures data describing depth information of a local area surrounding some or all of the HMD 1400. To that end, the DCA 1411 may include a laser radar (LIDAR), or a similar device. The depth information may be compared with the information from the IMU 1410, for better accuracy of determination of position and orientation of the HMD 1400 in 3D space.

The HMD 1400 may further include an eye tracking system 1414 for determining orientation and position of user's eyes in real time. The obtained position and orientation of the eyes also allows the HMD 1400 to determine the gaze direction of the user and to adjust the image generated by the display system 1480 accordingly. In some embodiments, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1402.

Figure 14B:
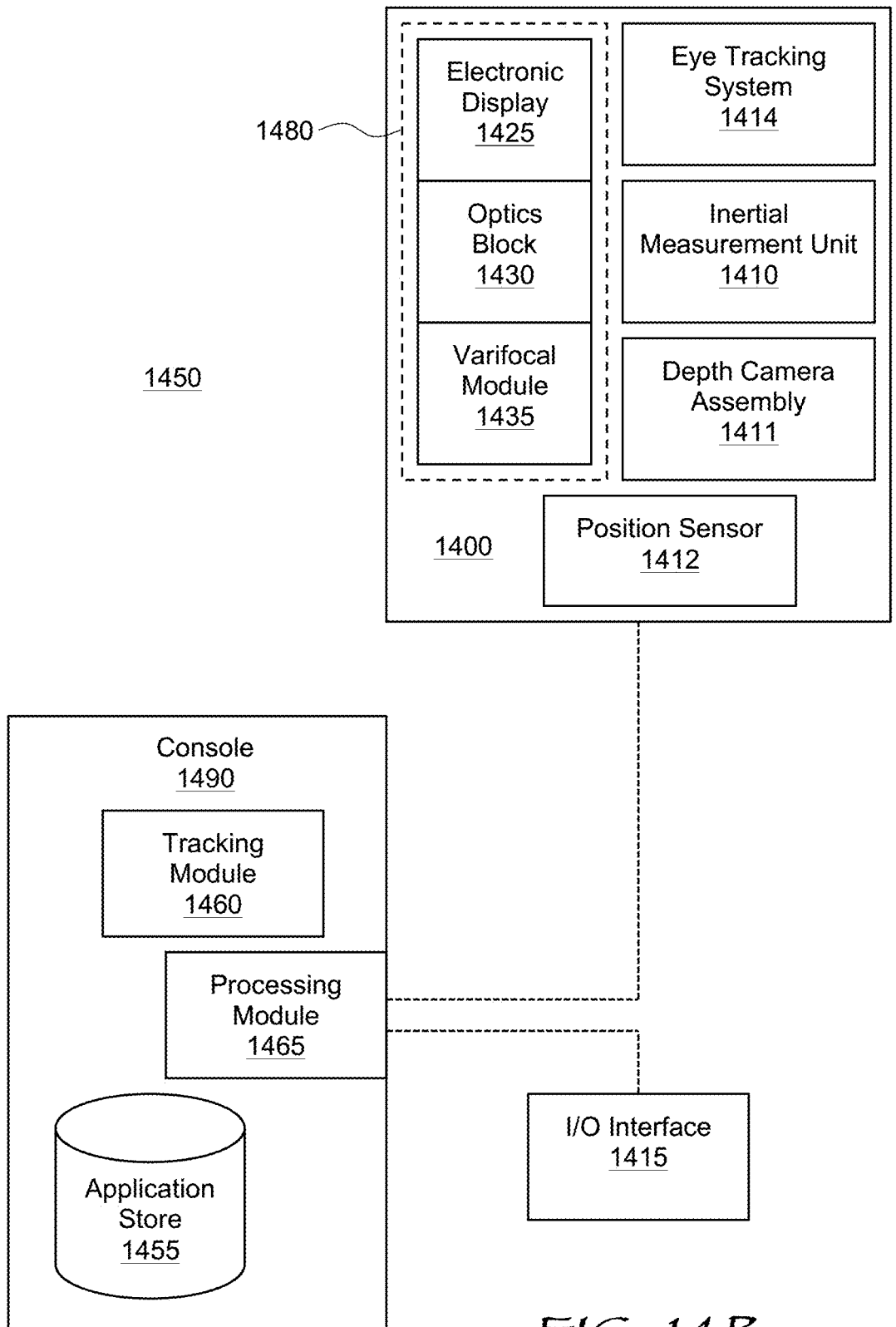
FIG. 14B is a block diagram of a virtual reality system including the headset of FIG. 14A.

Referring to FIG. 14B, an AR/VR system 1450 includes the HMD 1400 of FIG. 14A, an external console 1490 storing various AR/VR applications, setup and calibration procedures, 3D videos, etc., and an input/output (I/O) interface 1415 for operating the console 1490 and/or interacting with the AR/VR environment. The HMD 1400 may be "tethered" to the console 1490 with a physical cable, or connected to the console 1490 via a wireless communication link such as Bluetooth®, Wi-Fi, etc. There may be multiple HMDs 1400, each having an associated I/O interface 1415, with each HMD 1400 and I/O interface(s) 1415 communicating with the console 1490. In alternative configurations, different and/or additional components may be included in the AR/VR system 1450. Additionally, functionality described in conjunction with one or more of the components shown in FIGS. 14A and 14B may be distributed among the components in a different manner than described in conjunction with FIGS. 14A and 14B in some embodiments. For example, some or all of the functionality of the console 1415 may be provided by the HMD 1400, and vice versa. The HMD 1400 may be provided with a processing module capable of achieving such functionality.

As described above with reference to FIG. 14A, the HMD 1400 may include the eye tracking system 1414 (FIG. 14B) for tracking eye position and orientation, determining gaze angle and convergence angle, etc., the IMU 1410 for determining position and orientation of the HMD 1400 in 3D space, the DCA 1411 for capturing the outside environment, the position sensor 1412 for independently determining the position of the HMD 1400, and the display system 1480 for displaying AR/VR content to the user. The display system 1480 includes (FIG. 14B) an electronic display 1425, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1480 further includes an optics block 1430, whose function is to convey the images generated by the electronic display 1425 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1480 may further include a varifocal module 1435, which may be a part of the optics block 1430. The function of the varifocal module 1435 is to adjust the focus of the optics block 1430 e.g. to compensate for vergence-accommodation conflict, to correct for vision defects of a particular user, to offset aberrations of the optics block 1430, etc.

The I/O interface 1415 is a device that allows a user to send action requests and receive responses from the console 1490. An action request is a request to perform a particular action. For example, an action request may be an instruction to start or end capture of image or video data or an instruction to perform a particular action within an application. The I/O interface 1415 may include one or more input devices, such as a keyboard, a mouse, a game controller, or any other suitable device for receiving action requests and communicating the action requests to the console 1490. An action request received by the I/O interface 1415 is communicated to the console 1490, which performs an action corresponding to the action request. In some embodiments, the I/O interface 1415 includes an IMU that captures calibration data indicating an estimated position of the I/O interface 1415 relative to an initial position of the I/O interface 1415. In some embodiments, the I/O interface 1415 may provide haptic feedback to the user in accordance with instructions received from the console 1490. For example, haptic feedback can be provided when an action request is received, or the console 1490 communicates instructions to the I/O interface 1415 causing the I/O interface 1415 to generate haptic feedback when the console 1490 performs an action.

The console 1490 may provide content to the HMD 1400 for processing in accordance with information received from one or more of: the IMU 1410, the DCA 1411, the eye tracking system 1414, and the I/O interface 1415. In the example shown in FIG. 14B, the console 1490 includes an application store 1455, a tracking module 1460, and a processing module 1465. Some embodiments of the console 1490 may have different modules or components than those described in conjunction with FIG. 14B. Similarly, the functions further described below may be distributed among components of the console 1490 in a different manner than described in conjunction with FIGS. 14A and 14B.

The application store 1455 may store one or more applications for execution by the console 1490. An application is a group of instructions that, when executed by a processor, generates content for presentation to the user. Content generated by an application may be in response to inputs received from the user via movement of the HMD 1400 or the I/O interface 1415. Examples of applications include: gaming applications, presentation and conferencing applications, video playback applications, or other suitable applications.

The tracking module 1460 may calibrate the AR/VR system 1450 using one or more calibration parameters and may adjust one or more calibration parameters to reduce error in determination of the position of the HMD 1400 or the I/O interface 1415. Calibration performed by the tracking module 1460 also accounts for information received from the IMU 1410 in the HMD 1400 and/or an IMU included in the I/O interface 1415, if any. Additionally, if tracking of the HMD 1400 is lost, the tracking module 1460 may re-calibrate some or all of the AR/VR system 1450.

The tracking module 1460 may track movements of the HMD 1400 or of the I/O interface 1415, the IMU 1410, or some combination thereof. For example, the tracking module 1460 may determine a position of a reference point of the HMD 1400 in a mapping of a local area based on information from the HMD 1400. The tracking module 1460 may also determine positions of the reference point of the HMD 1400 or a reference point of the I/O interface 1415 using data indicating a position of the HMD 1400 from the IMU 1410 or using data indicating a position of the I/O interface 1415 from an IMU included in the I/O interface 1415, respectively. Furthermore, in some embodiments, the tracking module 1460 may use portions of data indicating a position or the HMD 1400 from the IMU 1410 as well as representations of the local area from the DCA 1411 to predict a future location of the HMD 1400. The tracking module 1460 provides the estimated or predicted future position of the HMD 1400 or the I/O interface 1415 to the processing module 1465.

The processing module 1465 may generate a 3D mapping of the area surrounding some or all of the HMD 1400 ("local area") based on information received from the HMD 1400. In some embodiments, the processing module 1465 determines depth information for the 3D mapping of the local area based on information received from the DCA 1411 that is relevant for techniques used in computing depth. In various embodiments, the processing module 1465 may use the depth information to update a model of the local area and generate content based in part on the updated model.

The processing module 1465 executes applications within the AR/VR system 1450 and receives position information, acceleration information, velocity information, predicted future positions, or some combination thereof, of the HMD 1400 from the tracking module 1460. Based on the received information, the processing module 1465 determines content to provide to the HMD 1400 for presentation to the user. For example, if the received information indicates that the user has looked to the left, the processing module 1465 generates content for the HMD 1400 that mirrors the user's movement in a virtual environment or in an environment augmenting the local area with additional content. Additionally, the processing module 1465 performs an action within an application executing on the console 1490 in response to an action request received from the I/O interface 1415 and provides feedback to the user that the action was performed. The provided feedback may be visual or audible feedback via the HMD 1400 or haptic feedback via the I/O interface 1415.

In some embodiments, based on the eye tracking information (e.g., orientation of the user's eyes) received from the eye tracking system 1414, the processing module 1465 determines resolution of the content provided to the HMD 1400 for presentation to the user on the electronic display 1425. The processing module 1465 may provide the content to the HMD 1400 having a maximum pixel resolution on the electronic display 1425 in a foveal region of the user's gaze. The processing module 1465 may provide a lower pixel resolution in other regions of the electronic display 1425, thus lessening power consumption of the AR/VR system 1450 and saving computing resources of the console 1490 without compromising a visual experience of the user. In some embodiments, the processing module 1465 can further use the eye tracking information to adjust where objects are displayed on the electronic display 1425 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A scanning projector display comprising:
    a plurality of light engines, each light engine comprising a light source subassembly for providing a diverging light beam optically coupled to a collimator for collimating the diverging light beam to provide a collimated light beam, the collimator comprising a folded-beam optical element comprising at least one reflective surface having optical power; and
    a MEMS scanner comprising a tiltable reflector configured to receive and scan the collimated light beam from each light engine of the plurality of light engines to form an image in angular domain;
    wherein in operation, the collimated light beams provided by different ones of the plurality of light engines impinge onto the tiltable reflector at different angles of incidence.

2. The scanning projector display of claim 1, wherein the tiltable reflector comprises a 2D tiltable reflector.

3. The scanning projector display of claim 1, wherein the light source subassembly comprises a solid-state light source.

4. The scanning projector display of claim 3, wherein the solid-state light source comprises a plurality of light-emitting semiconductor chips supported by a substrate.

5. The scanning projector display of claim 4, wherein the collimator is supported by the substrate of the corresponding solid-state light source.

6. The scanning projector display of claim 4, wherein at least one of the plurality of light-emitting semiconductor chips comprises a plurality of emitters.

7. The scanning projector display of claim 4, wherein the plurality of light-emitting semiconductor chips comprises a plurality of superluminescent light-emitting diodes (SLEDs).

8. The scanning projector display of claim 4, wherein the plurality of light-emitting semiconductor chips comprises red, green, and blue color channel light-emitting semiconductor chips for emitting light beams of red, green, and blue color channels, respectively, of the image to be displayed.

9. The scanning projector display of claim 8, wherein the red, green, and blue color channel light-emitting semiconductor chips are side-emitting chips for emitting the light beams at respective end facets of the red, green, and blue color channel light-emitting semiconductor chips.

10. The scanning projector display of claim 9, wherein the end facets of the red, green, and blue color channel light-emitting semiconductor chips are disposed at different distances from the corresponding collimator to offset chromatic aberration of the collimator.

11. The scanning projector display of claim 8, wherein the red, green, and blue color channel light-emitting semiconductor chips are oriented at different angles w.r.t the corresponding collimator to direct their light beams to a clear aperture of the collimator.

12. The scanning projector display of claim 1, wherein the tiltable reflector has a range of tilt angles, wherein in operation, a difference between angles of incidence of the collimated light beams provided by two of the plurality of light engines at the tiltable reflector is no greater than the range of tilt angles of the tiltable reflector, such that an overlap exists between fields of view provided by each one of the two of the plurality of light engines.

13. The scanning projector display of claim 12, wherein the overlap is at least 10% of the field of view provided by each one of the two of the plurality of light engines.

14. The scanning projector display of claim 12, further comprising a controller operably coupled to the light source subassembly of each light engine of the plurality of light engines and the MEMS scanner for tilting the tiltable reflector of the MEMS scanner and configured to energize the light source of each light engine in coordination with tilting the tiltable reflector for displaying the image.

15. The scanning projector display of claim 14, wherein the controller is further configured to energize the light source of each light engine with a delay corresponding to a difference of the angles of incidence of the corresponding collimated light beams onto the tiltable reflector.

16. A method for displaying an image, the method comprising:
    energizing a plurality of light engines for providing a plurality of collimated light beams;
    directing the plurality of collimated light beams onto a tiltable reflector of a MEMS scanner, wherein different ones of the collimated light beams impinge onto the tiltable reflector of the MEMS scanner at different angles of incidence; and
    tilting the tiltable reflector of the MEMS scanner in coordination with the energizing the plurality of light engines to display the image;
    wherein each collimated light beam of the plurality of collimated light beams is obtained using a collimator comprising a folded-beam optical element comprising at least one reflective surface having optical power.

17. The method of claim 16, wherein the light engines are energized with a delay corresponding to a difference of the angles of incidence of the corresponding collimated light beams onto the tiltable reflector.

18. A scanning projector display comprising:
    a first light engine comprising a first light source subassembly for providing a first diverging light beam optically coupled to a first collimator for collimating the first diverging light beam to provide a first collimated light beam having a first polarization;

a second light engine comprising a second light source subassembly for providing a second diverging light beam optically coupled to a second collimator for collimating the second diverging light beam to provide a second collimated light beam having a second polarization orthogonal to the first polarization;

a polarization beam combiner configured for receiving the first and second collimated light beams and combining the first and second collimated light beams into an output beam; and a MEMS scanner comprising a tiltable reflector configured to receive and scan the output beam to form an image in angular domain;

wherein the first collimator and the second collimator comprise a folded-beam optical element comprising at least one reflective surface having optical power; and wherein in operation, the collimated light beam provided by the first light engine impinges onto the tiltable reflector at a different angle of incidence than the collimated light beam provided by the second light engine.

19. The scanning projector display of claim 18, further comprising a controller operably coupled to the first and second light source subassemblies and the MEMS scanner for tilting the tiltable reflector of the MEMS scanner and configured to energize the first and second light source subassemblies in coordination with tilting the tiltable reflector for displaying the image.

* * * * *